(12) United States Patent
Pogorelik et al.

(10) Patent No.: US 10,448,453 B2
(45) Date of Patent: Oct. 15, 2019

(54) VIRTUAL SENSOR SYSTEM

(71) Applicant: Intel Corporation, Santa Clara, CA (US)

(72) Inventors: Oleg Pogorelik, Lapid (IL); Avi Priev, Modi'in (IL)

(73) Assignee: INTEL CORPORATION, Santa Clara, CA (US)

( * ) Notice: Subject to any disclaimer, the term of this patent is extended or adjusted under 35 U.S.C. 154(b) by 15 days.

(21) Appl. No.: 14/866,330

(22) Filed: Sep. 25, 2015

(65) Prior Publication Data

US 2017/0094716 A1 Mar. 30, 2017

(51) Int. Cl.
*H04W 84/18* (2009.01)
*H04L 29/08* (2006.01)

(52) U.S. Cl.
CPC ............ *H04W 84/18* (2013.01); *H04L 67/12* (2013.01); *H04L 67/22* (2013.01); *H04L 67/28* (2013.01)

(58) Field of Classification Search
CPC ..... H04W 84/12; H04W 48/16; H04W 88/08; H04W 48/20; H04W 84/18; H04L 67/12; H04L 67/22; H04L 67/28
USPC .......................................................... 370/338
See application file for complete search history.

(56) References Cited

U.S. PATENT DOCUMENTS

| 7,688,198 B2 * | 3/2010 | Amidi ..................... G08B 21/14 340/539.13 |
| 2002/0165933 A1 * | 11/2002 | Yu ......................... G05B 19/042 709/217 |
| 2011/0246148 A1 * | 10/2011 | Gupta ..................... H04W 64/00 703/2 |
| 2012/0083911 A1 * | 4/2012 | Louboutin ............ G06F 1/1632 700/94 |
| 2013/0096831 A1 * | 4/2013 | Chan ..................... H04W 4/043 702/1 |
| 2014/0005809 A1 * | 1/2014 | Frei ...................... H04L 29/1249 700/90 |

(Continued)

FOREIGN PATENT DOCUMENTS

| KR | 1020120049184 | 5/2012 |
| KR | 1020120140254 | 12/2012 |

OTHER PUBLICATIONS

PCT Application No. PCT/US2016/045188, Notification Concerning Transmittal of International Preliminary Report on Patentability, dated Apr. 5, 2018, 7 pgs.

*Primary Examiner* — Shailendra Kumar
(74) *Attorney, Agent, or Firm* — Womble Bond Dickinson (US) LLP

(57) ABSTRACT

Embodiments are generally directed to a virtual sensor system. An embodiment of a mobile device includes a transmitter to transmit data and a receiver to receive data; and one or more sensors. Upon receiving a measurement request from a requestor, the measurement request including one or more measurement requirements including at least one type of sensor measurement, the mobile electronic device is to compare the one or more measurement requirements against at least sensor capabilities of the mobile electronic device. Upon determining that there is a match between the sensor capabilities and the one or more measurement requirements, the mobile electronic device is to perform a measurement with at least one of the one or more sensors to produce sensor data, and transmit a response including the sensor data to the requestor.

23 Claims, 7 Drawing Sheets

(56) References Cited

U.S. PATENT DOCUMENTS

| | | | |
|---|---|---|---|
| 2014/0364101 A1* | 12/2014 | Do | H04W 4/02 |
| | | | 455/418 |
| 2015/0067154 A1* | 3/2015 | Ly | H04L 43/0876 |
| | | | 709/224 |
| 2015/0181156 A1* | 6/2015 | Dureau | G06F 9/5044 |
| | | | 348/552 |
| 2015/0338281 A1* | 11/2015 | Ross | G01K 3/14 |
| | | | 236/44 A |
| 2015/0370621 A1* | 12/2015 | Karp | G05B 15/02 |
| | | | 719/328 |
| 2018/0270635 A1* | 9/2018 | Guo | H04W 72/04 |

* cited by examiner

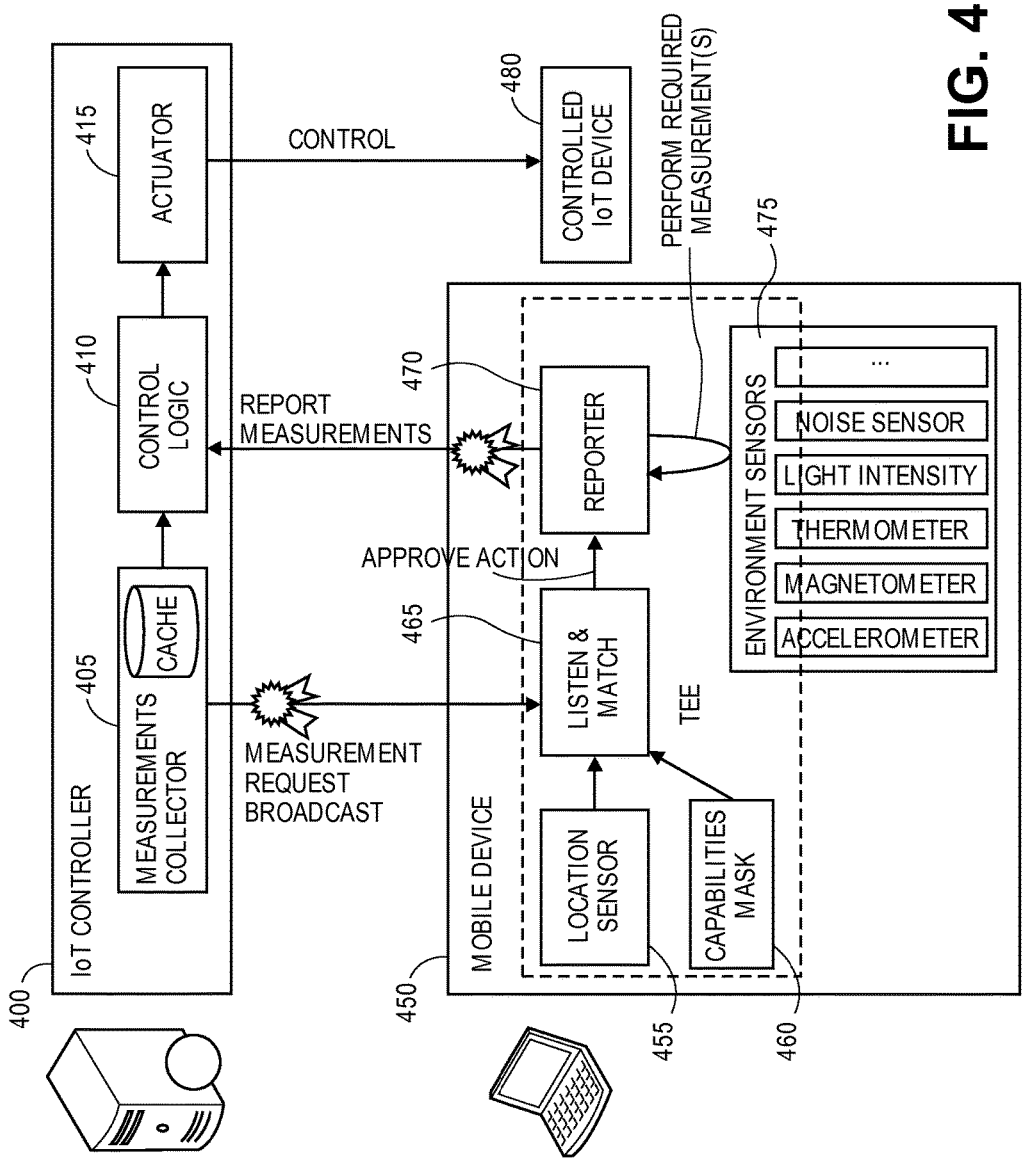

VIRTUAL SENSOR SYSTEM

TECHNICAL FIELD

Embodiments described herein generally relate to the field of electronic devices and, more particularly, to a virtual sensor system.

BACKGROUND

A large facility or complex, including an office building, government facility, industrial campus, college or university, or other structure or complex, may utilize numerous sensors to monitor and control services such as heating and cooling, lighting, security, and other services.

The Internet of Things (IoT) allows for the connection of an increasing variety of devices and systems, including the connection of sensors. The devices that are connected have varied functions and capabilities, which are changing rapidly as new devices are conceived and produced.

However, the implementation and maintenance of sensors for a large facility or complex can be very costly. Further, as the needs of the facility or complex expand or change, there is a need to modify and upgrade the sensors, thereby causing additional sensor costs.

BRIEF DESCRIPTION OF THE DRAWINGS

Embodiments described here are illustrated by way of example, and not by way of limitation, in the figures of the accompanying drawings in which like reference numerals refer to similar elements.

FIG. 4 is an illustration of operations of a controller and mobile device in a virtual sensor environment according to an embodiment;

DETAILED DESCRIPTION

Figure 1:
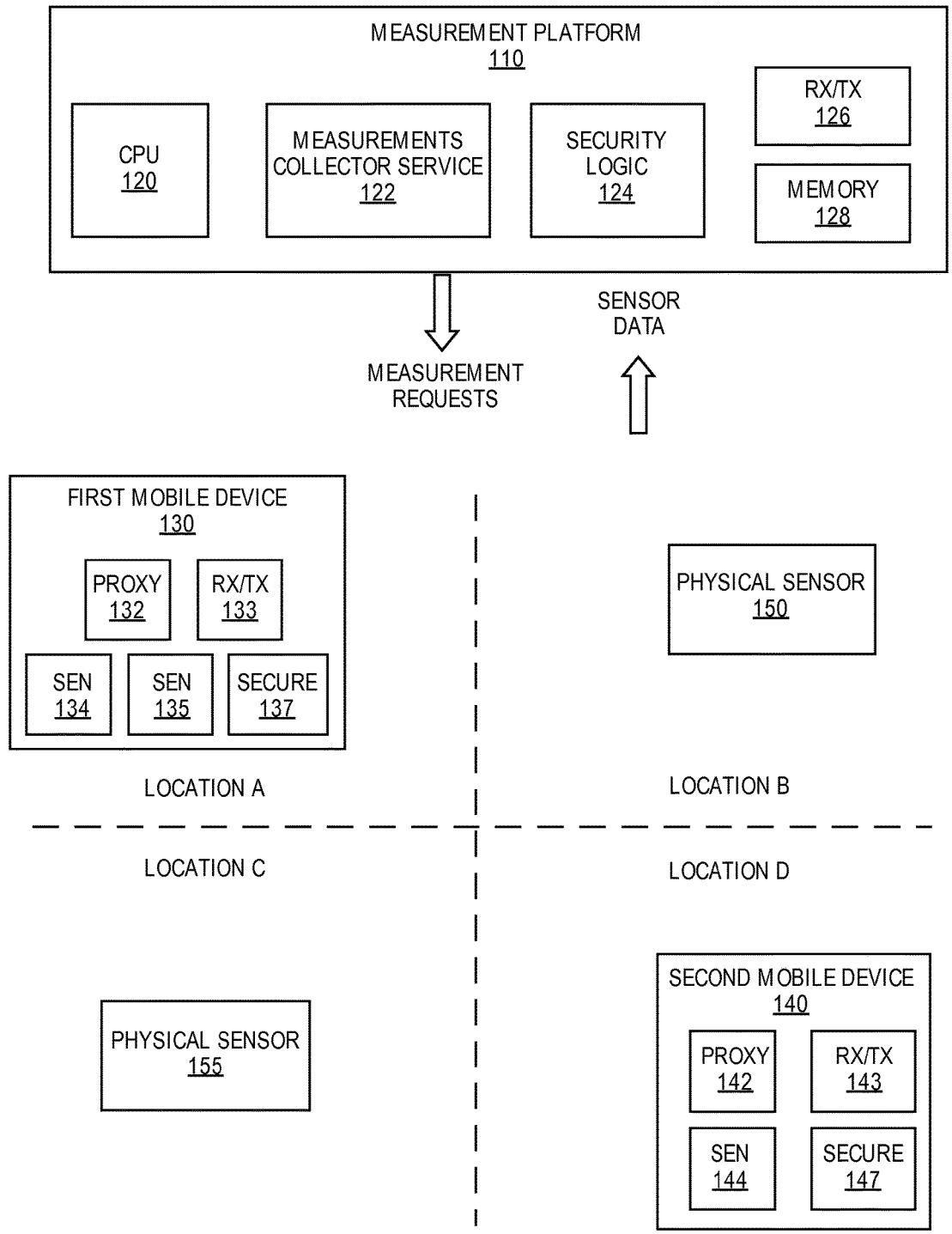
FIG. 1 is an illustration of a measurement system utilizing virtual sensor devices according to an embodiment.

Embodiments described herein are generally directed to a virtual sensor system.

For the purposes of this description:

"Mobile electronic device" or "mobile device" means a smartphone, smartwatch, tablet computer, notebook or laptop computer, handheld computer, mobile Internet device, wearable technology, or other mobile electronic device that includes processing capability.

"Sensor" means a mechanism to detect conditions, events, or changes in an environment and to produce a resulting output, wherein the output may be referred to as sensor data, sensing data, or similar terms. The output of a sensor may include, but is not limited to, electrical and optical signals. Conditions, events, and changes in an environment may include, but are not limited to, temperature, light (luminosity), sound, moisture, humidity, barometric pressure, vibration, electrical or magnetic fields, motion, and acceleration.

The Internet of Things (IoT) allows for the connection of an increasing variety of devices and systems. The devices that are connected have varied functions and capabilities, which are changing rapidly as new devices are conceived and produced.

Many IoT solutions are based on sensors being installed in appropriate places and reporting the measurements to the higher level systems for working out operational decisions. For example, an energy saving air conditioning system may include several temperature and user-presence sensors installed in the rooms and/or open spaces. The data from these temperature and presence sensors may be used to determine which locations require additional cooling, and which locations, including unoccupied locations, may be allowed to rise in temperature, thus allowing significant energy savings over a plan to cool all locations.

However, installing a variety of different sensors in a large facility may result in increased system complexity, bill of materials, and maintenance expenses, and as a result negatively impacts overall cost of the sensor system. As a facility's needs change, there may a great cost in changing the sensor system.

In some embodiments, a virtual sensor system, including, but not limited to, a virtual IoT sensor solution, enables the same or similar functionality of a full sensor system, while reducing the number of physical sensors compared to the required currently. In some embodiments, a virtual sensor system is a system utilizing ability of the smart mobile devices (including devices such as smart phones, laptop computers, and tablet computers) to measure and report certain required parameters to an authorized system, such as an authorized IoT control system, as virtual sensors, in lieu of or in addition to the use of physical IoT sensors installed in the given area.

In some embodiments, to implement virtual sensing, a virtual sensing IoT controller is operable to periodically broadcast measurement requests, which may also be referred to as service advertisements, announcements, or similar terms. In some embodiments, a measurement request may specify certain sensing requirements (which may also be referred to as measurement requirements), the sensing requirements including one or more capabilities and conditions, for example, a particular type or types of sensing capability and a specific location or locations for sensing operation. In an example of an IoT sensor system, utilizing service advertisement operation enables contact with mobile devices in an IoT environment in which the connected devices aren't necessarily known to the sensor system.

In some embodiments, one or more mobile devices are enabled for virtual sensing, and are operable to monitor for measurement request broadcasts. In some embodiments, in circumstances in which a mobile device determines that such device meets the received sensing requirements of a received measurement request from a requestor, where the sensing requirements may include, but are not limited to, a location of the mobile device and at least one capability meeting the sensing requirements of the broadcasted measurement request, the mobile device is operable to respond to the measurement request, the mobile device to measure one or more required parameter with one or more sensors and report to the requestor with sensor data.

In some embodiments, beneficial factors in implementing a virtual sensor system, such as a virtual IoT sensor system, may include:

(a) Reduction in an overall cost of the IoT sensor system as fewer physical sensors are required when virtual sensors are implemented, and backup or expansion sensors may be utilized to avoid urgent needs for replacements or expansion in a system.

(b) Allowance of a scalable solution that is capable of growing without adding physical sensors, or without adding as many physical sensors as would otherwise be needed.

(c) Provides for rapid response to sensor failure, which may be addressed by providing temporary sensor failure mitigation until physical sensors are repaired or replaced.

(d) Provides a base for building alternative or advanced cases, such as a mobile probing service in which physical sensors are not available.

(e) Capability to support a wide variety of sensors, which may potentially be as many types of sensors as are available in mobile devices, and thus provides capability to enable future enhancement.

In some embodiments, a mobile device may complement existing IoT sensors, may act as temporary replacements for failed devices, or may be applied for other uses, such as calibration.

In some embodiments, a sensor system, which may be a static system, can accommodate new mobile devices with new sensor capabilities in the future, including different types of sensors that are not now available. Examples of sensors that might potentially be available include, but are not limited to, chemical sensors, oxygen sensors, radiation sensors, and other sensors. Thus, an embodiment of a sensor may be operable to take advantage of new capabilities without requiring modification of the sensor system.

In some embodiments, a sensor may address various types of sensor requirements, which may include ongoing sensor requirements (such as when a system is designed to relay at least in part on virtual sensors); temporary sensor requirements (such as when a physical sensor fails, or when there is an expansion or change in system requirements); or special sensor requirements, such as an emergency situation in which sensors that are not normally required in order to address an emergency.

FIG. 1 is an illustration of a virtual sensor system utilizing virtual sensor devices according to an embodiment. In some embodiments, a virtual sensor system includes:

(1) A measurement platform 110, which operates to obtain certain sensor data and implement certain functions or services based upon the received sensor data. A measurement platform may 110 include one or more processors, such as central processing unit (CPU) 120, a measurements collector service 122, security logic 124, a receiver and transmitter 126 for communicating with mobile devices acting as virtual sensor, where communications may include wired or wireless (including radio and optical) communications, and memory 128, including memory to store applications that utilize sensor data and to store receive sensor data from physical and virtual sensors. In some embodiments, the measurements collector service 122 includes a trusted IoT controller broadcasting information about required measurements in appropriate locations. In some embodiments, the platform 110 may receive data from one or more physical sensors, such as physical sensor 150 in Location B and physical sensor 155 in Location C. In an example, the platform 110 may require sensor services in Location A and Location D, where either no physical sensors are present to provide needed sensor data or such physical sensors are unavailable for any reason, including failure.

Figure 6:
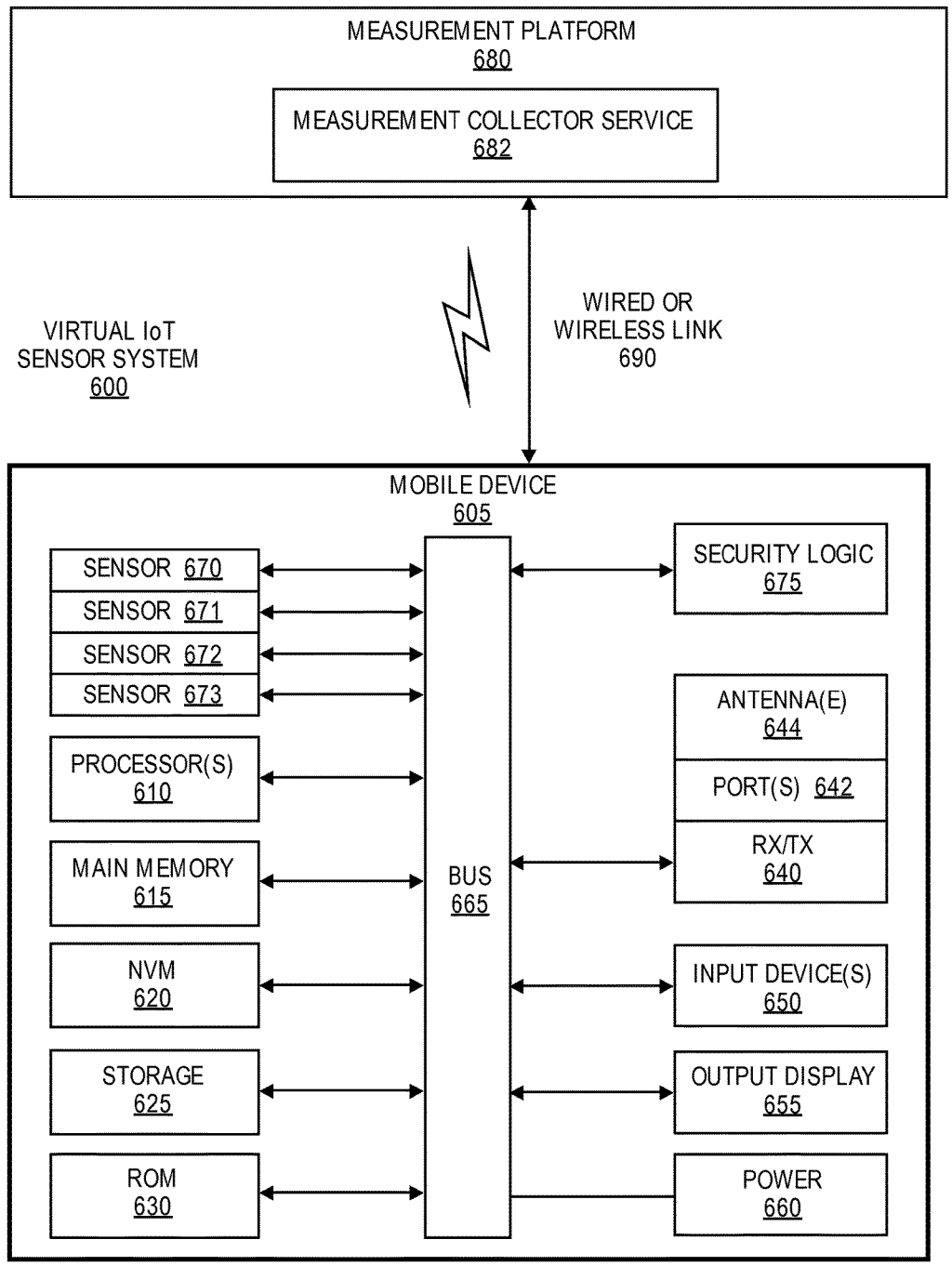
FIG. 6 is an illustration of an embodiment of a mobile device to operate as a virtual sensor in a virtual IoT sensor system according to an embodiment.

(2) One or more mobile devices in one or more locations, wherein the one or more mobile devices may include sensing capability for virtual sensor operation. In some embodiments, a mobile device, such as the illustrated first mobile device 130 in Location A, may include a mobile device measurement proxy 132; a transmitter and receiver 133 to provide wired or wireless communication, including communications regarding measurement requests and sensor data; one or more sensors, such as sensor 134 and 135; and security logic 137. As illustrated, as second mobile device 140 in Location D includes a measurement proxy 142, a receiver and transmitter 143, at least one sensor 144, and security logic 147. In some embodiments, the mobile devices may include elements such as illustrated in FIG. 6.

In some embodiments, a mobile device, such as mobile device 130, is enabled and certified for reporting of the measurements performed using embedded sensors. In some embodiments, the measurement proxy 132 is operable to listen to (monitor) measurement request broadcasts, compare current capabilities and conditions versus received sensing requirements, respond to the measurement requests, the perform and report measurements to the requester if there is match between current capabilities and conditions and the requested capabilities and conditions. As illustrated, communications between a measurement collection platform 110 and mobile devices 130 and 140 may include broadcasts of measurement requests by the platform; and responses from one or more mobile devices with sensor data. In some embodiments, the particular communications may vary, such as, for example, a first message including sensing requirements; a first response indicating sensing capabilities; a second message requesting particular sensor measurements; and a second response including obtained sensor data. In some embodiments, the communications may be otherwise be otherwise varied or combined.

An example request providing certain locations for measurement (such as Locations A and D) and certain measurement needs (such as noise over time) may be:

Request: {Locations: A, D–Measurements: t, Noise}

In some embodiments, after receiving requested measurement data, a collector service is operable to store the received sensor data and provide the sensor data to one or more higher level applications upon demand or use for working out related control commands.

Figure 2:
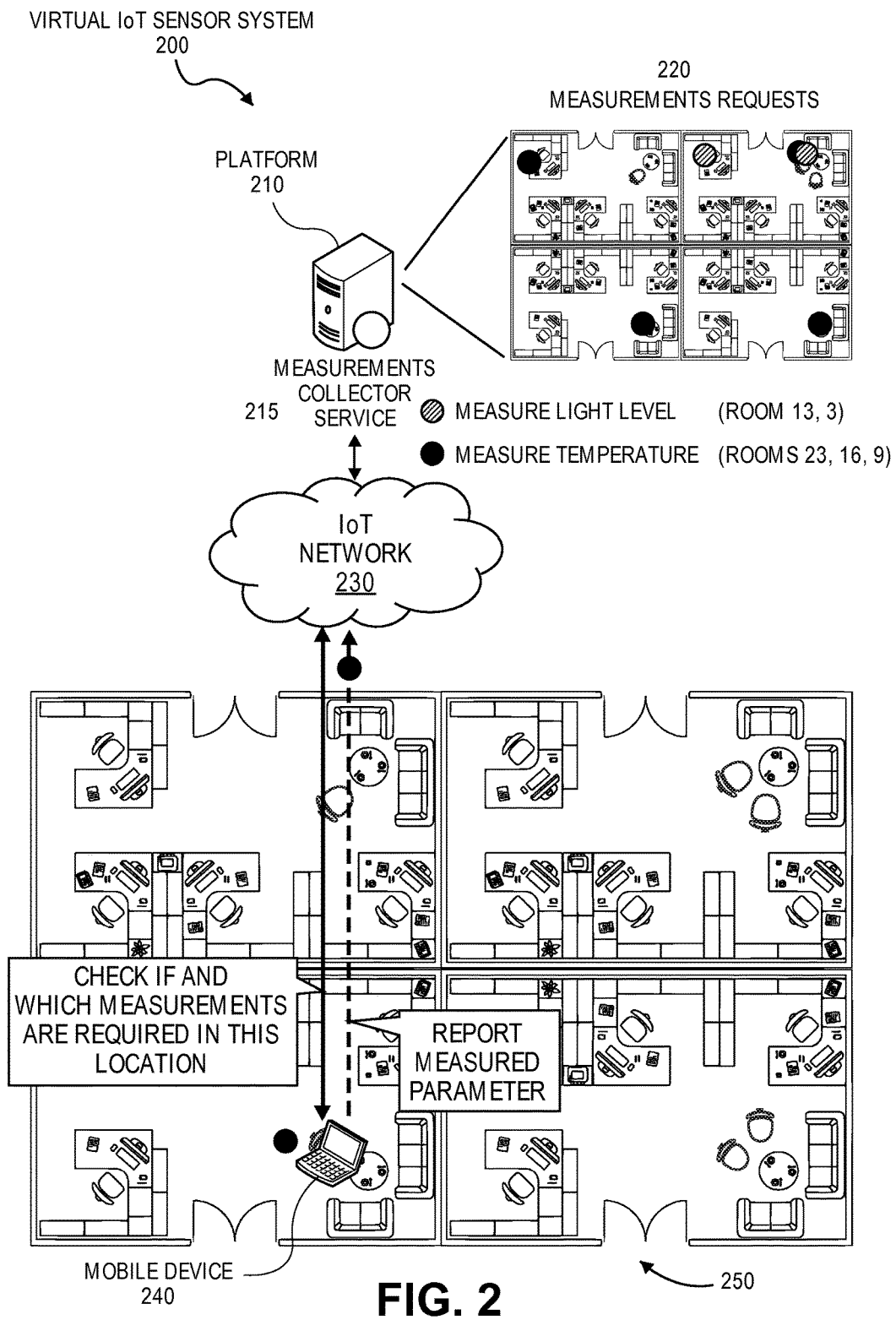
FIG. 2 is an illustration of an office virtual IoT measurement system according to an embodiment.

FIG. 2 is an illustration of an office virtual IoT sensor system according to an embodiment. In this illustration, an office virtual IoT sensor system 200 includes a platform 210 including a measurement collector service 215 and one or more mobile devices, including mobile device 240, located in particular locations at certain moments in time within an office environment 250. In some embodiments, the system provides means for the platform 210 and the mobile devices 240 to meet with each other via an IoT network 230 through measurement advertisements/queries (referred to herein as measurement requests) to the mobile devices, the measurement requests including measurement requirements such as sensing capability needs and sensing location. In some embodiments, upon discovery of one or more mobile devices meeting the measurement requirements, the platform is operable to receive sensor data from such mobile devices.

In the example illustrated in FIG. 2, the measurements collector service 215 provides measurement requests 220, including a first request for light level measurements in Rooms 13 and 3 and a second request for temperature measurements in rooms 23, 16, and 9. Further in the example, at a certain time mobile device 240 is located in room 23 and includes a temperature sensor. In this example, upon receiving the second request, the mobile device 240 may determine that the mobile device 240 meets the measurement requirements, including temperature sensing capability and location in room 23, and the mobile device may then make the requested measurement to generate sensor data, and provide such sensor data to the measurement collector service.

In some embodiments, the virtual sensor system 200 can provide significant cost savings. In the example provided in FIG. 2, the system 200 can, for example, operate with fewer (or no) temperature and lighting sensors (or other sensors) in the system. In some embodiments, the system 200 allows for dynamic modification of sensor environment as devices move in and out of locations, and thus there are no issues when a device leaves a particular location.

In some embodiments, mobile devices are operable to expose their sensor capabilities and support security measures for sensor operation. In some embodiments, the platform 210 and mobile devices 240 may use digital certificates for security, with security being checked by both the platform and the mobile devices. However, in alternative embodiments the system can also operate with in a venue with less security through use of statistical analysis, with, for example, sensors providing anonymous information and a platform looking at results from many different sensors to determine a sensor value.

In some embodiments, a virtual sensor system allows many inputs to provide an exacting map of sensor readings, in comparison with averaging readings when only a few sensors are available. Further, the cost of utilizing many sensors is very low because the addition of new sensors has little or no cost as the platform 210 will simply request more mobile devices to expand into a new area, such as, for example, expanding into a new part of a building. Further, there is no limit on the number of sensors other than the capabilities of the platform 210 and the bandwidth for communication, and thus the platform may utilize hundreds of sensors in many different locations in a particular environment. Such operation further greatly reduces maintenance costs as well, and allows for quick backup in case permanent sensors fail.

In some embodiments, the virtual sensor system allows for placement of sensors in locations where it is difficult or impossible to add sensors because, for example, there is no power or the location is outside of the building. In one example, the platform 210 can obtain temperature information for the exterior of the office environment, outside the building, by requesting temperature data from mobile devices that are outside of the building. As long as the wired or wireless network reaches the needed location, mobile devices can respond to such request.

In some embodiments, the provided sensor data is anonymous, which adds to the security of the system. In some embodiments, the only data required or provided is sensor capability, sensor readings, and location and time attached to the sensor data.

Figure 3:
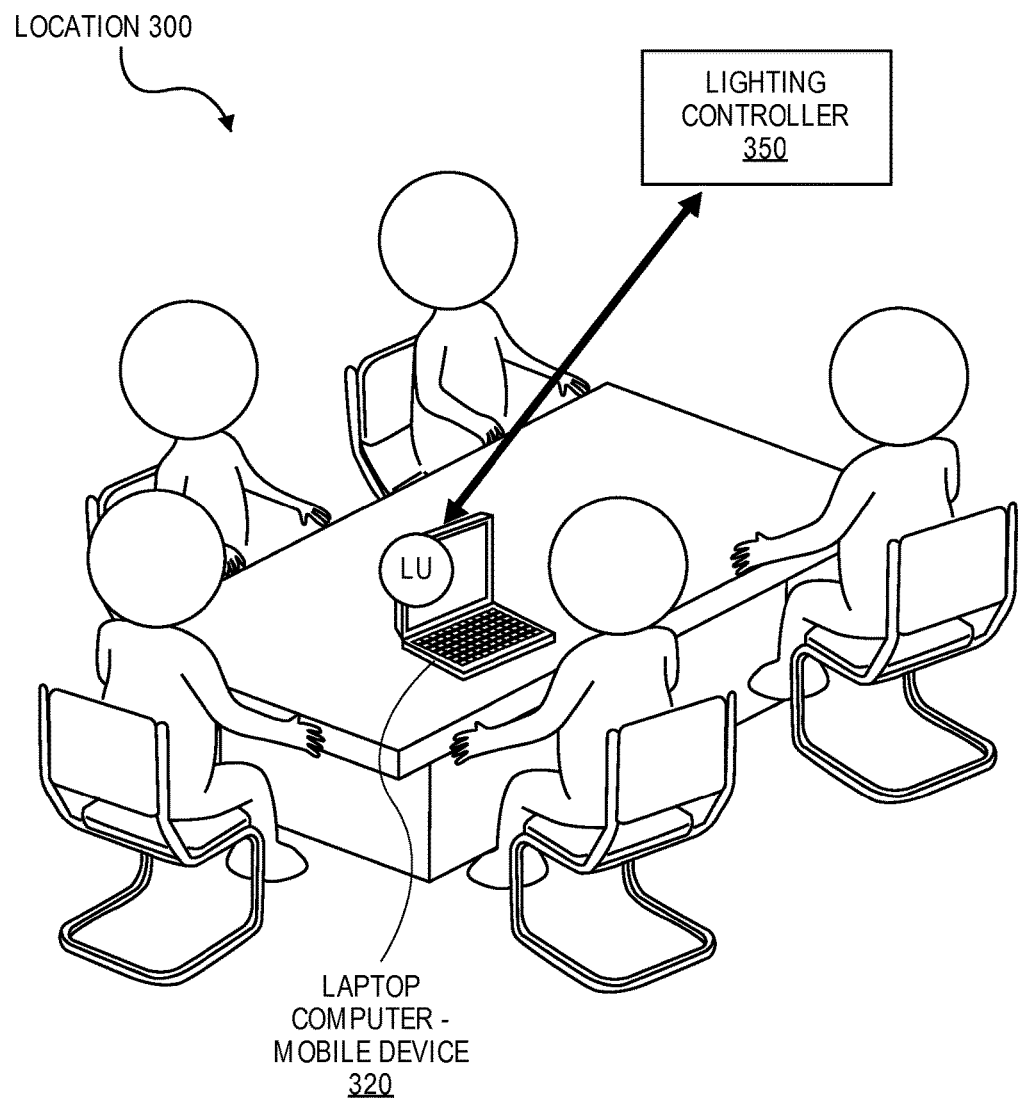
FIG. 3 is an illustration of an example of an implementation of a virtual sensor system according to an embodiment.

FIG. 3 is an illustration of an example of an implementation of a virtual sensor system according to an embodiment. In a particular example, a virtual sensor system operates to generate and transmit a measurement request to request luminosity sensor capability in a certain location 300, such as the illustrated conference room. The virtual sensor system may be as illustrated in FIG. 2.

In this example, a user's mobile device, laptop computer 320, is currently located in the conference room 300 and is equipped with an appropriate ambient light sensor to measure luminosity (LU). In some embodiments, the laptop computer 320 is operable to determine that the capabilities match the measurement request, and is operable to measure luminosity sensor data, and report the sensor data, which may be used, for example, by a lighting controller 350 for balancing local light intensity.

FIG. 4 is an illustration of operations of a controller and mobile device in a virtual sensor environment according to an embodiment. In some embodiments, an IoT controller 400 includes a measurements collector 405, which is operable to generate and transmit a measurement request. In some embodiments, a mobile device 450 is operable to listen and match the measurement request 465 based at least in part upon output of a location sensor 455 and a capabilities mask 460, wherein the capabilities mask 460 reflects capabilities of one or more environment sensors 475. In some embodiments, the mobile device is operable to approve action based on the match of the measurement request and performs the required measurements utilizing one or more of the environment sensors 475, which are illustrated as, for example, an accelerometer, a magnetometer, a thermometer, a light intensity meter, and a noise sensor. In some embodiments, a reporter 470 of the mobile device 450 is operable to report measurements (sensor data) back to the IoT controller 400. In some embodiments, control logic 410 of the IoT controller is operable to provide instruction to an actuator 415 based at least in part on the received measurement data, and the actuator is operable provide control for a controlled IoT device 480. In some embodiments, to ensure higher trustworthiness, the measurements may be run in a trusted execution environment (TEE).

Figure 5A:
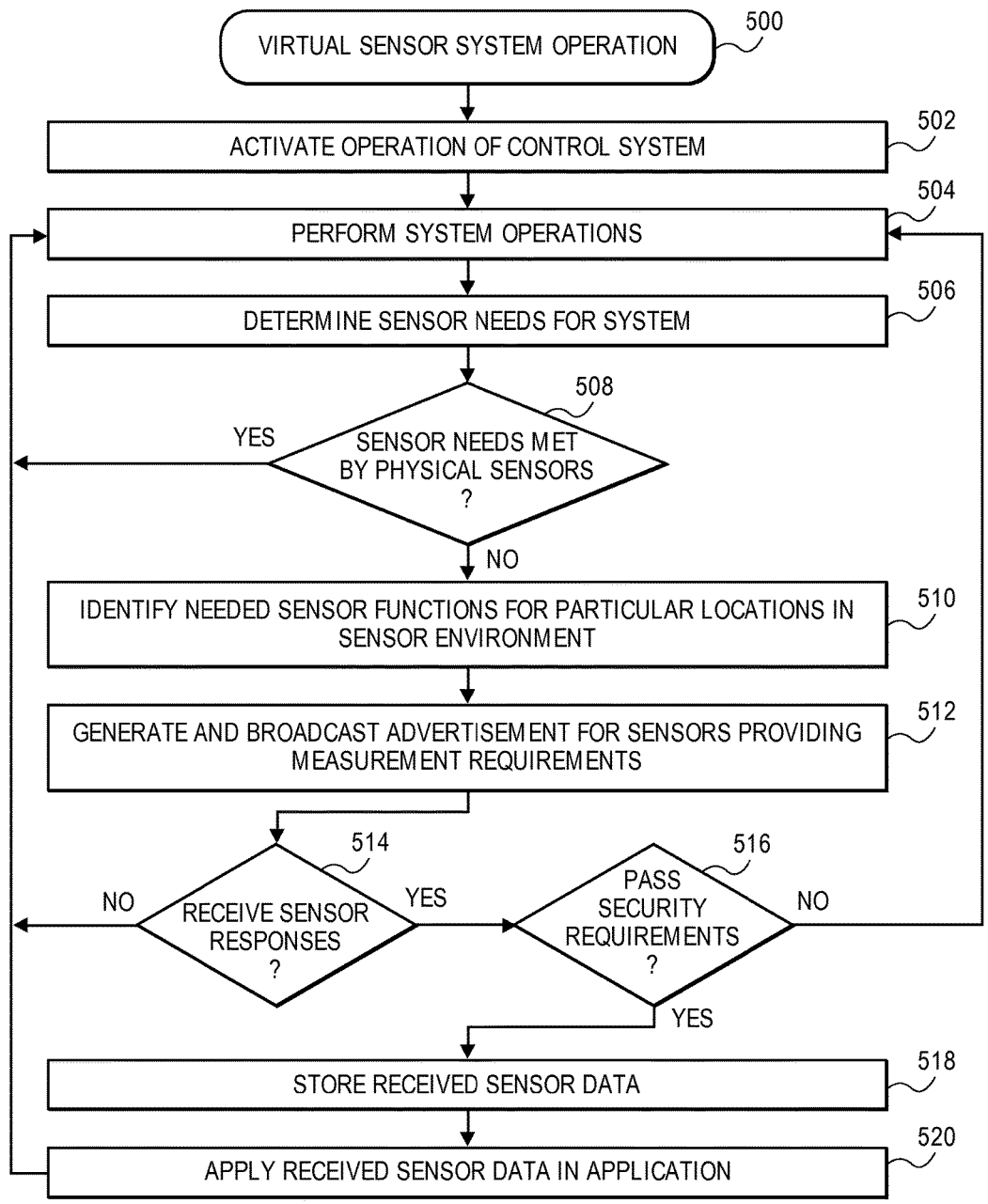
FIG. 5A is a flowchart to illustrate a process for virtual sensing in a sensor system according to an embodiment.

FIG. 5A is a flowchart to illustrate a process for virtual sensing in a sensor system according to an embodiment. In some embodiments, in a virtual sensor system operation 500, the operation of a particular control system is activated 502 and the system operations are performed 504. The system may include any operation that is based at least in part on sensor readings. In some embodiments, sensor needs for the system are determined 506. If the sensor needs are met by existing physical sensors 508, then the process can continue with the performance of system operations 504.

If there are any sensor needs that are not met by existing physical sensors 508, the needed sensor measurements in particular locations are identified 510, and a measurement advertisement is generated and broadcast 512. In some embodiments, the measurement advertisement includes the application of specific security. In some embodiments, the measurement advertisement is signed using a digital certificate issued for authorized IoT control systems. In some embodiments, the advertisement may be broadcast narrowly or widely depending on the specific sensor requirements and the location for such requirements.

If sensor data is received in response to the advertisement 514 and the response passes security requirements 516, the received sensor data is stored 518 and the received data is applied in one or more applications 520. In some embodiments, the measurement data report may require a signature by an appropriate digital certificate (indicating proof of authenticity and freshness of the measurements). In some embodiments, to ensure higher trustworthiness the measurements could run in a trusted execution environment (TEE).

Figure 5B:
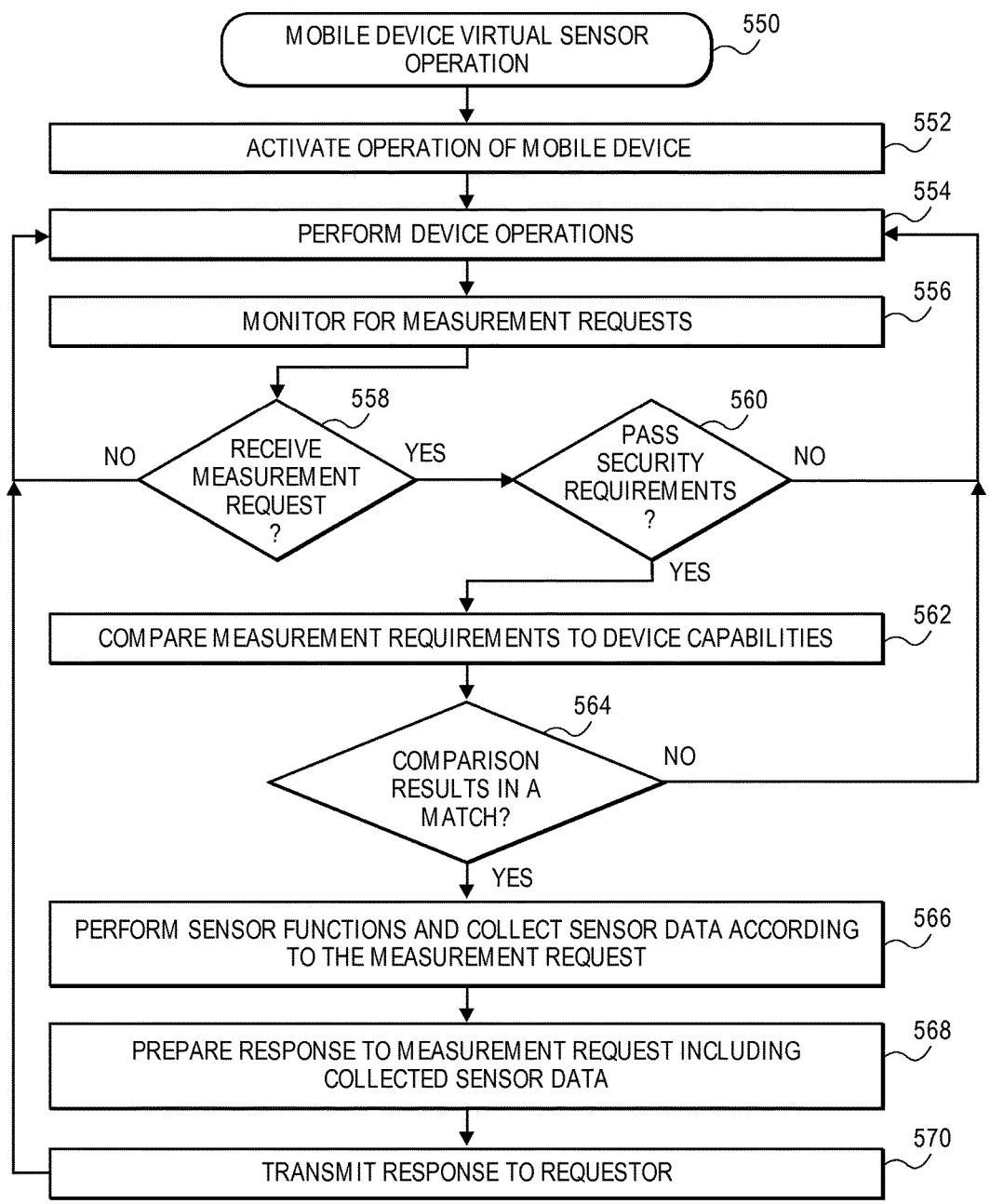
FIG. 5B is a flowchart to illustrate a process for mobile device virtual sensor operation according to an embodiment.

FIG. 5B is a flowchart to illustrate a process for mobile device virtual sensor operation according to an embodiment. In some embodiments, in a mobile device virtual sensor operation 550, the operation of the mobile device is activated 552 and the mobile device performs normal device operations 554. In some embodiments, the mobile device further monitors for measurement requests 556.

Upon receipt of a measurement request from a requestor 558, there may be a determination whether the measurement request meets security requirements 560, such as a valid digital certificate. If so, the mobile device is to compare measurement requirements of the received measurement request to capabilities of the mobile device 562.

Upon determining that there is a match between the measurement requirements and the mobile device capabilities 564, the mobile device is to perform sensor functions and collect sensor data according to the measurement request 566. A response to the measurement request is prepared, including the collected sensor data 568, and the response is transmitted to the requestor 570. Preparation of the response may include signing with a digital certificate to secure the response.

FIG. 6 is an illustration of an embodiment of a mobile device to operate as a virtual sensor a virtual IoT sensor system according to an embodiment. In this illustration, certain standard and well-known components that are not germane to the present description are not shown. Elements shown as separate elements may be combined, including, for example, an SoC (System on Chip) combining multiple elements on a single chip.

In some embodiments, a virtual IoT sensor system includes a measurement collection platform 680 having a measurement collector service that provides measurement requests and receives sensor data from mobile devices, including mobile device 605. In some embodiments, measurement collection platform 680 may be as illustrated in FIG. 1. In some embodiments, the measurement collection platform 680 operates in an IoT environment, and may include one or more physical sensors, such as sensors 150 and 155 illustrated in FIG. 1. The measurement collection platform and mobile device may communicate via a wired or wireless link 690.

In some embodiments, the mobile device may include one or more sensors 670-673 to detect conditions, events, or changes in an environment and to produce a resulting output. In some embodiments, the mobile device 605 may further be certified for operation as a virtual sensor in a virtual sensor environment, including security logic 675. Security logic may include, but is not limited to, capability to evaluate a digital certificate for a measurement request, and capability to sign a digital certificate for sensor data that is provided in response to a measurement request.

In some embodiments, the mobile device 605 (as well as the measurement collector platform 680) may further include additional elements for operation, including the following:

In some embodiments, the mobile device 605 includes processing means such as one or more processors 610 coupled to one or more buses or interconnects, shown in general as bus 665. The processors 610 may comprise one or more physical processors and one or more logical processors. In some embodiments, the processors may include one or more general-purpose processors or special-processor processors. The bus 665 is a communication means for transmission of data. The bus 665 is illustrated as a single bus for simplicity, but may represent multiple different interconnects or buses and the component connections to such interconnects or buses may vary. The bus 665 shown in FIG. 6 is an abstraction that represents any one or more separate physical buses, point-to-point connections, or both connected by appropriate bridges, adapters, or controllers.

In some embodiments, the mobile device 605 further comprises a random access memory (RAM) or other dynamic storage device or element as a main memory 615 for storing information and instructions to be executed by the processors 610. Main memory 615 may include, but is not limited to, dynamic random access memory (DRAM).

The mobile device 605 also may comprise a non-volatile memory (NVM) 620; a storage device such as a solid state drive (SSD) 625; and a read only memory (ROM) 630 or other static storage device for storing static information and instructions for the processors 610.

In some embodiments, the mobile device 605 includes one or more transmitters or receivers 640 coupled to the bus 665 to provide wired or wireless communications. In some embodiments, the mobile device 605 may include one or more antennae 644, such as dipole or monopole antennae, for the transmission and reception of data via wireless communication using a wireless transmitter, receiver, or both, and one or more ports 642 for the transmission and reception of data via wired communications. Wireless communication includes, but is not limited to, Wi-Fi, Bluetooth™, near field communication, and other wireless communication standards. Wired or wireless communications may include communications between the measurement collector platform 680 and the mobile device 605.

In some embodiments, mobile device 605 includes one or more input devices 650 for the input of data, including hard and soft buttons, a joy stick, a mouse or other pointing device, a keyboard, voice command system, or gesture recognition system.

In some embodiments, the mobile device 605 includes an output display 655, where the display 655 may include a liquid crystal display (LCD) or any other display technology, for displaying information or content to a user. In some environments, the display 655 may include a touch-screen that is also utilized as at least a part of an input device 650. Output display 655 may further include audio output, including one or more speakers, audio output jacks, or other audio, and other output to the user.

The mobile device 605 may also comprise a battery or other power source 660, which may include a solar cell, a fuel cell, a charged capacitor, near field inductive coupling, or other system or device for providing or generating power in the mobile device 605. The power provided by the power source 660 may be distributed as required to elements of the mobile device 605.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, a mobile electronic device includes a transmitter to transmit data and a receiver to receive data; and one or more sensors, wherein, upon receipt of a measurement request from a requestor, the measurement request including one or more measurement requirements including at least one type of sensor measurement, the mobile electronic device is to compare the one or more measurement requirements against at least sensor capabilities of the mobile electronic device, upon a determination that there is a match between the sensor capabilities and the one or more measurement requirements, perform a measurement as a virtual sensor utilizing at least one of the one or more sensors to produce sensor data, and transmit a response including the sensor data to the requestor.

In some embodiments, the mobile electronic device includes a measurement proxy, the measurement proxy to monitor for measurement requests from requestors.

In some embodiments, the mobile electronic device further includes security logic, wherein the mobile electronic device is operable to evaluate security of a received measurement request and to provide a secure response to a received measurement request.

In some embodiments, the mobile electronic device further includes a location detector to detect a location of the mobile electronic device, wherein the one or more measurement requirements include a location for sensor measurement, the mobile electronic device to further compare a current location of the mobile electronic device to the location for sensor measurement.

In some embodiments, the response further includes a time of measurement.

In some embodiments, the measurement request and response are communicated via the Internet of Things (IoT).

In some embodiments, the one or more sensors include one or more of a sensor to measure temperature, light (luminosity), sound, moisture, humidity, barometric pressure, vibration, electrical or magnetic fields, motion, or acceleration.

In some embodiments, the measurement request and the response may be communicated by a wired or wireless link.

In some embodiments, a measurement platform includes a measurements collector service to collect sensor data; a transmitter to transmit data and a receiver to receive data; and a memory to store data, wherein, upon the measurements collector service determining that the measurement platform requires a virtual sensor function, the measurements collector service is to generate a measurement request including one or more measurement requirements, the one or more measurement requirements including at least one types of sensor measurement, and to broadcast the measurement request, and receive sensor data from a mobile device acting as a virtual sensor in response to the measurement request and store the received sensor data in the memory.

In some embodiments, the platform further includes security logic, wherein the platform is operable to provide a secure measurement request and to evaluate security of a received response.

In some embodiments, the one or more measurement requirements include a location for sensor measurement.

In some embodiments, the measurement request and response are communicated via the Internet of Things (IoT).

In some embodiments, the measurement request and the sensor data may be communicated by a wired or wireless link.

In some embodiments, a method includes determining sensor needs for a system; upon identifying a sensor need that is not met by existing sensors, generating a measurement request including one or more measurement requirements, the one or more measurement requirements including at least one type of sensor measurement; broadcasting the measurement request; receiving a response to the measurement request from a mobile electronic device operating as a virtual sensor, the response including sensor data generated by the mobile electronic device; and storing the received sensor data in a memory.

In some embodiments, generating the measurement request includes providing a digital certificate to secure the measurement request.

In some embodiments, the method further includes evaluating security of the received response.

In some embodiments, the one or more measurement requirements include a location for sensor measurement.

In some embodiments, the measurement request and response are communicated via the Internet of Things (IoT).

In some embodiments, a method includes monitoring in a mobile electronic device for measurement requests from a requestor; receiving a measurement request including one or more measurement requirements, the one or more measurement requirements including at least one type of sensor measurement; comparing the measurement requirement to capabilities of the mobile electronic device; and upon determining that there is a match between the measurement requirements and the mobile device capabilities: performing measurement by at least one sensor of the mobile device according to the measurement requirements and collecting sensor data from the measurement, and generating a response to the measurement request including the collected sensor data.

In some embodiments, the method further includes evaluating a digital certificate of the measurement request to determine authority for the measurement request.

In some embodiments, generating the measurement request further includes providing a digital certificate to secure the measurement request.

In some embodiments, the one or more measurement requirements include a location for sensor measurement.

In some embodiments, the measurement request and response are communicated via the Internet of Things (IoT).

In some embodiments, a non-transitory computer-readable storage medium having stored thereon data representing sequences of instructions that, when executed by a processor, cause the processor to perform operations including determining sensor needs for a system; upon identifying a sensor need that is not met by existing sensors, generating a measurement request including one or more measurement requirements, the one or more measurement requirements including at least one type of sensor measurement; broadcasting the measurement request; receiving a response to the measurement request from a mobile electronic device operating as a virtual sensor, the response including sensor data generated by the mobile electronic device; and storing the received sensor data in a memory.

In some embodiments, generating the measurement request includes providing a digital certificate to secure the measurement request.

In some embodiments, the medium further includes instructions for evaluating security of the received response.

In some embodiments, the one or more measurement requirements include a location for sensor measurement.

In some embodiments, the measurement request and response are communicated via the Internet of Things (IoT).

In some embodiments, an apparatus includes means for determining sensor needs for a system; means for generating a measurement request upon identifying a sensor need that is not met by existing sensors including one or more measurement requirements, the one or more measurement requirements including at least one type of sensor measurement; means for broadcasting the measurement request; means for receiving a response to the measurement request from a mobile electronic device operating as a virtual sensor, the response including sensor data generated by the mobile electronic device; and means for storing the received sensor data in a memory.

In some embodiments, generating the measurement request includes providing a digital certificate to secure the measurement request.

In some embodiments, the medium further includes instructions for evaluating security of the received response.

In some embodiments, the one or more measurement requirements include a location for sensor measurement.

In some embodiments, the measurement request and response are communicated via the Internet of Things (IoT).

In some embodiments, a non-transitory computer-readable storage medium having stored thereon data representing sequences of instructions that, when executed by a processor, cause the processor to perform operations including monitoring in a mobile electronic device for measurement requests from a requestor; receiving a measurement request including one or more measurement requirements, the one or more measurement requirements including at least one type of sensor measurement; comparing the measurement requirement to capabilities of the mobile electronic device; and upon determining that there is a match between the measurement requirements and the mobile device capabilities: performing measurement by at least one sensor of the mobile device according to the measurement requirements and collecting sensor data from the measurement, and generating a response to the measurement request including the collected sensor data.

In some embodiments, the medium further includes instructions for evaluating a digital certificate of the measurement request to determine authority for the measurement request.

In some embodiments, generating the measurement request further includes providing a digital certificate to secure the measurement request.

In some embodiments, the one or more measurement requirements include a location for sensor measurement.

In some embodiments, the measurement request and response are communicated via the Internet of Things (IoT).

In some embodiments, an apparatus includes means for monitoring in a mobile electronic device for measurement requests from a requestor; means for receiving a measurement request including one or more measurement requirements, the one or more measurement requirements including at least one type of sensor measurement; means for comparing the measurement requirement to capabilities of the mobile electronic device; and means for the following upon determining that there is a match between the measurement requirements and the mobile device capabilities: performing measurement by at least one sensor of the mobile device according to the measurement requirements and collecting sensor data from the measurement, and generating a response to the measurement request including the collected sensor data.

In some embodiments, the apparatus further includes means for evaluating a digital certificate of the measurement request to determine authority for the measurement request.

In some embodiments, generating the measurement request further includes providing a digital certificate to secure the measurement request.

In some embodiments, the one or more measurement requirements include a location for sensor measurement.

In some embodiments, the measurement request and response are communicated via the Internet of Things (IoT).

What is claimed is:

1. A mobile electronic device comprising:
   a transmitter to transmit data and a receiver to receive data; and
   one or more sensors; wherein, upon receipt of a measurement request broadcasted from a requestor, the measurement request including one or more measurement requirements including at least one type of sensor measurement, the mobile electronic device is to:
   compare the one or more measurement requirements against at least sensor capabilities of the mobile electronic device to determine if the mobile electronic device is able to obtain at least one type of sensor measurement in the broadcasted measurement request,
   upon a determination that there is a match between the sensor capabilities and the one or more measurement requirements, perform a measurement as a virtual sensor utilizing at least one of the one or more sensors to produce sensor data, and
   transmit a response including the sensor data to the requestor.

2. The device of claim 1, wherein the mobile electronic device includes a measurement proxy, the measurement proxy to monitor for measurement requests from requestors.

3. The device of claim 1, further comprising security logic, wherein the mobile electronic device is operable to evaluate security of a received measurement request and to provide a secure response to a received measurement request.

4. The device of claim 1, further comprising a location detector to detect a location of the mobile electronic device, wherein the one or more measurement requirements include a location for sensor measurement, the mobile electronic device to further compare a current location of the mobile electronic device to the location for sensor measurement.

5. The device of claim 1, wherein the response further includes a time of measurement.

6. The device of claim 1, wherein the measurement request and response are communicated via the Internet of Things (IoT).

7. The device of claim 1, wherein the one or more sensors include one or more of a sensor to measure temperature, light (luminosity), sound, moisture, humidity, barometric pressure, vibration, electrical or magnetic fields, motion, or acceleration.

8. The device of claim 1, wherein the measurement request and the response may be communicated by a wired or wireless link.

9. A measurement platform comprising:
   a measurements collector service to collect sensor data;
   a transmitter to transmit data and a receiver to receive data; and
   a memory to store data; wherein, upon the measurements collector service determining that the measurement platform requires a virtual sensor function, the measurements collector service is to:
   generate a measurement request including one or more measurement requirements, the one or more measurement requirements including at least one type of sensor measurement, and to broadcast the measurement request to one or more mobile devices to determine if the one or more mobile devices are capable to provide the measurement requirements broadcasted in the measurement request, and
   receive sensor data from at least one mobile device acting as a virtual sensor capable to provide the one or more measurement requirements in response to the broadcasted measurement request and store the received sensor data in the memory.

10. The platform of claim 9, further comprising security logic, wherein the platform is operable to provide a secure measurement request and to evaluate security of a received response.

11. The platform of claim 9, wherein the one or more measurement requirements include a location for sensor measurement.

12. The platform of claim 9, wherein the measurement request and response are communicated via the Internet of Things (IoT).

13. The platform of claim 9, wherein the measurement request and the sensor data may be communicated by a wired or wireless link.

14. A non-transitory computer-readable storage medium having stored thereon data representing sequences of instructions that, when execute by a processor, cause the processor to perform operations comprising:
   determining sensor needs for a system;
   upon identifying a sensor need that is not met by existing sensors, generating a measurement request including one or more measurement requirements, the one or more measurement requirements including at least one type of sensor measurement;
   broadcasting the measurement request to one or more mobile electronic devices to determine if the one or more mobile electronic devices are capable to provide the measurement requirements;
   receiving a response to the broadcasted measurement request from at least one mobile electronic device operating as a virtual sensor capable to provide the one or more measurement requirements, the response including sensor data generated by at least one mobile electronic device; and
   storing the received sensor data in a memory.

15. The medium of claim 14, wherein generating the measurement request includes providing a digital certificate to secure the measurement request.

16. The medium of claim 15, further comprising instructions that, when executed by the processor, cause the processor to perform operations comprising:
   evaluating security of the received response.

17. The medium of claim 14, wherein the one or more measurement requirements include a location for sensor measurement.

18. The medium of claim 14, wherein the measurement request and response are communicated via the Internet of Things (IoT).

19. A non-transitory computer-readable storage medium having stored thereon data representing sequences of instructions that, when executed by a processor, cause the processor to perform operations comprising:
   monitoring in a mobile electronic device for measurement requests broadcasted from a requestor;
   receiving a measurement request including one or more measurement requirements, the one or more measurement requirements including at least one type of sensor measurement;
   comparing the measurement requirement to capabilities of the mobile electronic device to determine if the mobile electronic device is able to obtain at least one type of sensor measurement in the broadcasted measurement requests; and upon determining that there is a match between the measurement requirements and the mobile electronic device capabilities:

performing measurement by at least one sensor of the mobile device according to the measurement requirements and collecting sensor data from the measurement, and generating a response to the measurement request including the collected sensor data.

20. The medium of claim 19, further comprising instructions that, when executed by the processor, cause the processor to perform operations comprising:

evaluating a digital certificate of the measurement request to determine authority for the measurement request.

21. The medium of claim 20, wherein generating the measurement request further includes providing a digital certificate to secure the measurement request.

22. The medium of claim 19, wherein the one or more measurement requirements include a location for sensor measurement.

23. The medium of claim 19, wherein the measurement request and response are communicated via the Internet of Things (IoT).

* * * * *